April 14, 1964   E. LUDLOW ETAL   3,128,841
SOUND ATTENUATING GAS CONDUIT AND RESONATORS THEREFOR
Filed Aug. 17, 1961   6 Sheets-Sheet 3
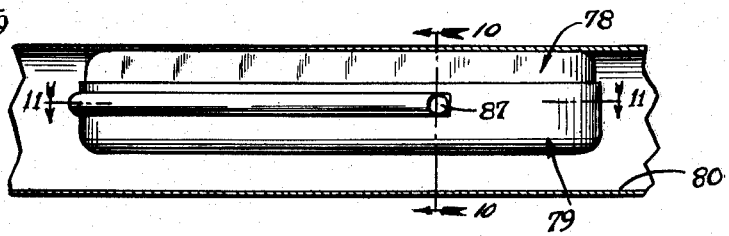
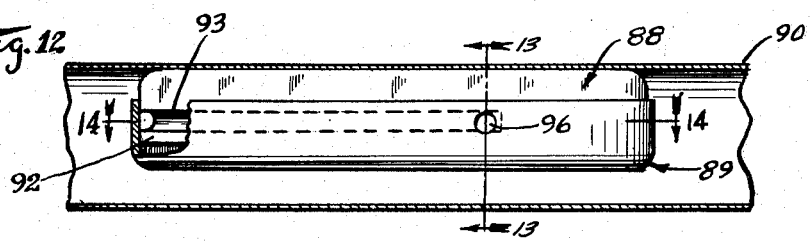
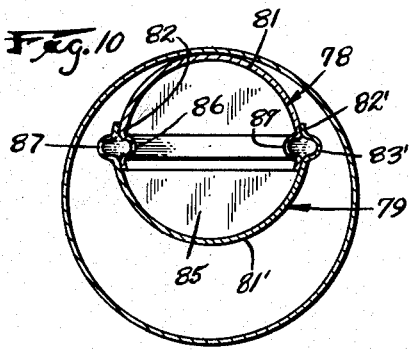
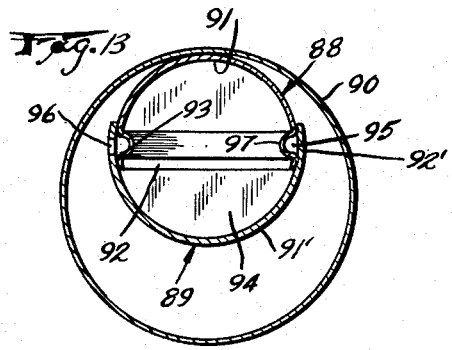
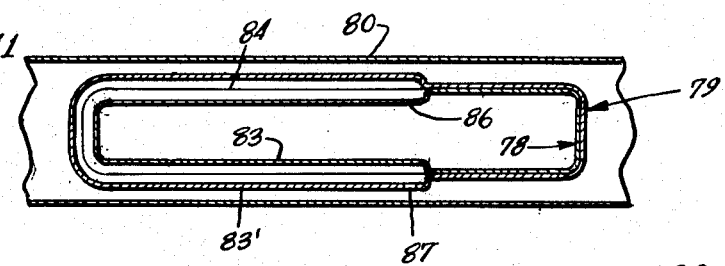
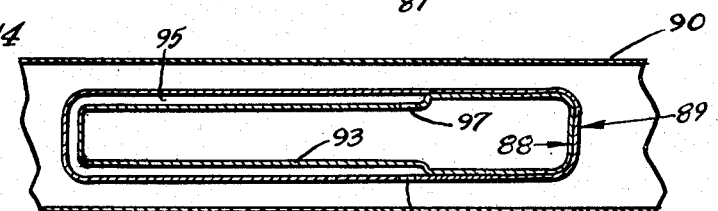
INVENTORS.
EDMUND LUDLOW &
BENJAMIN H. IRWIN,
BY Trask, Jenkins & Hanley
ATTORNEYS.

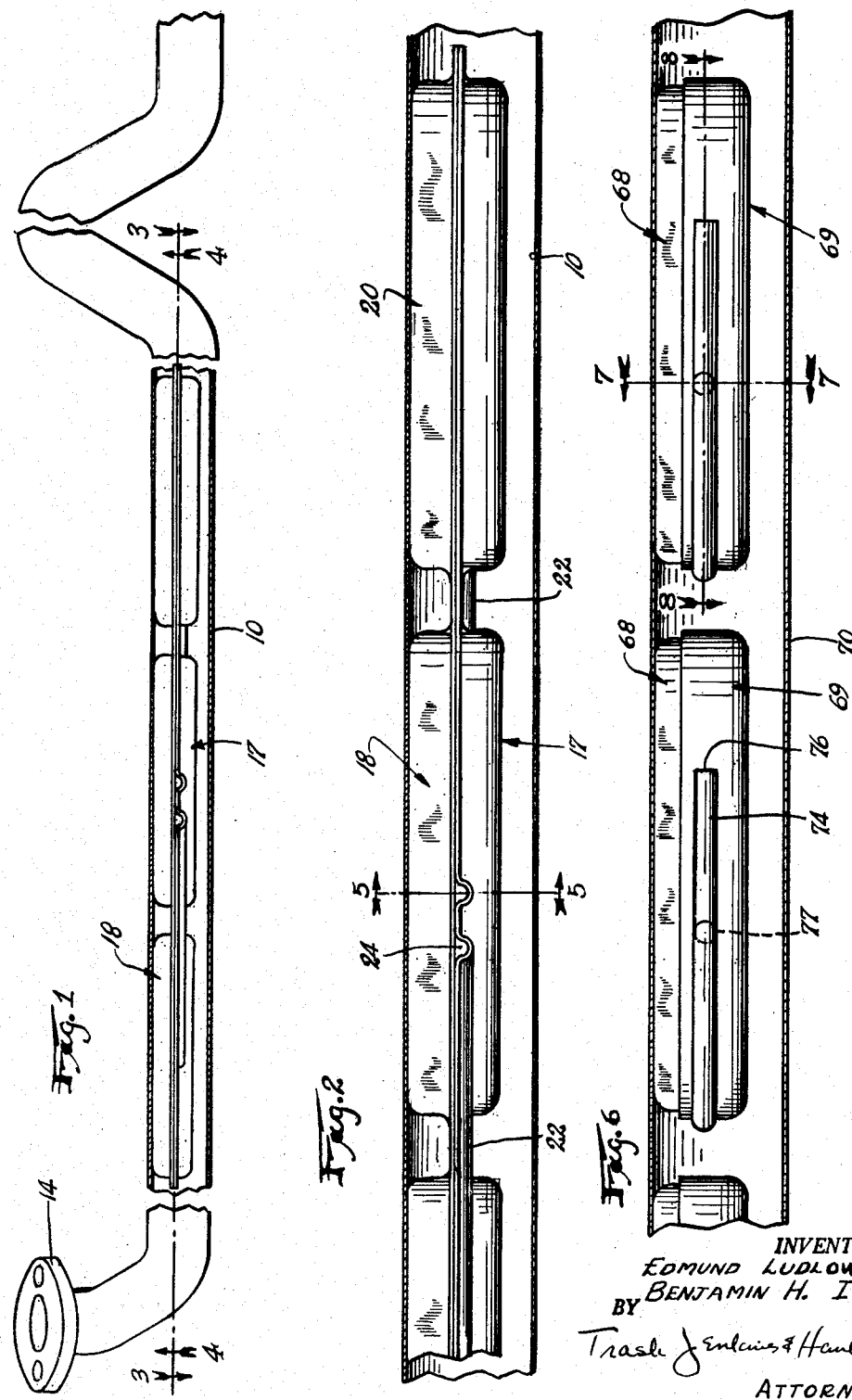

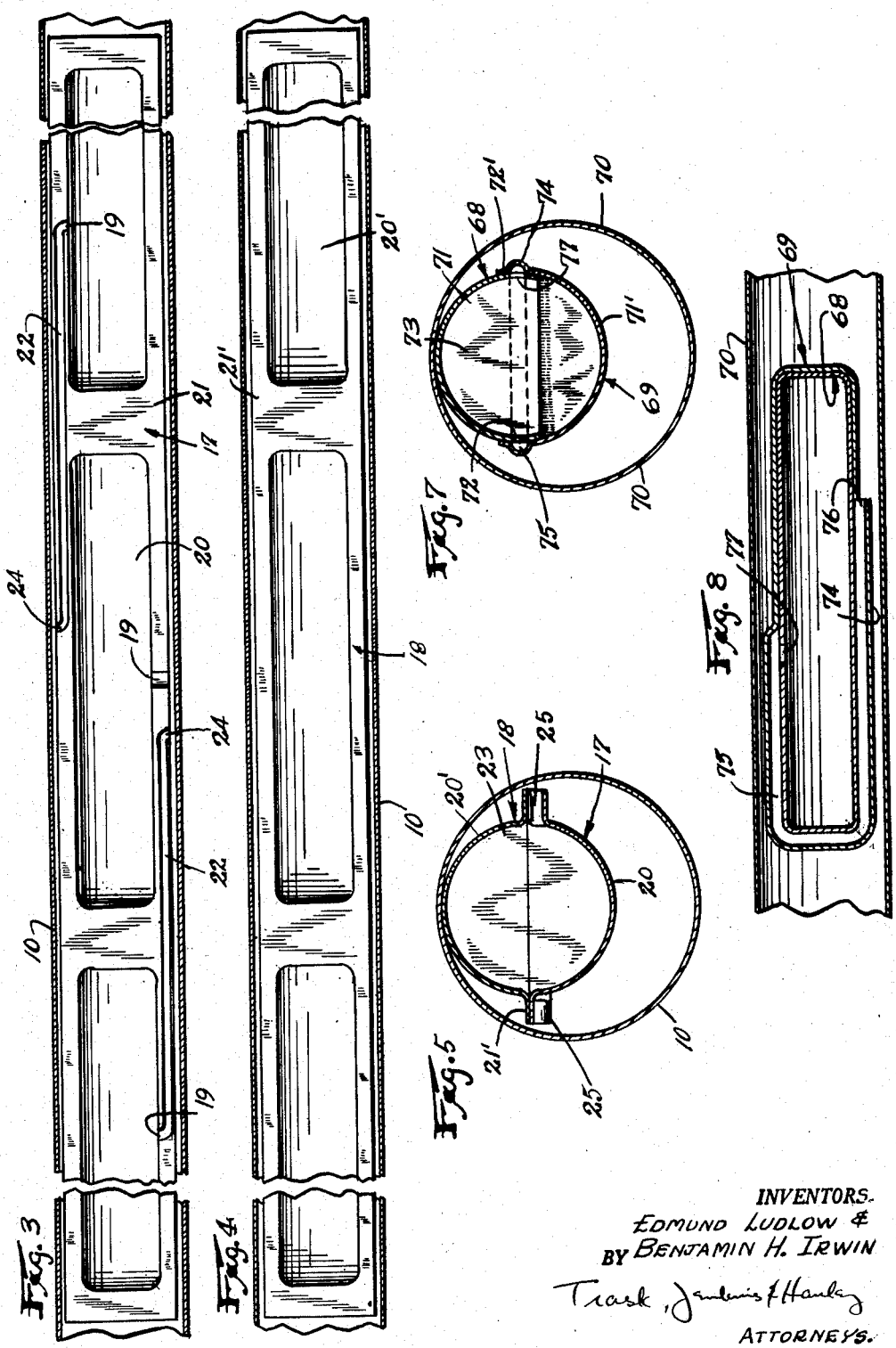

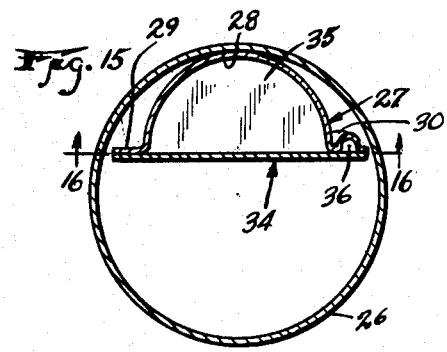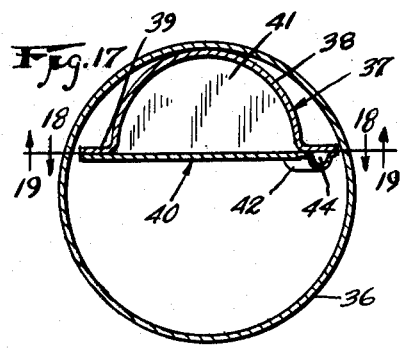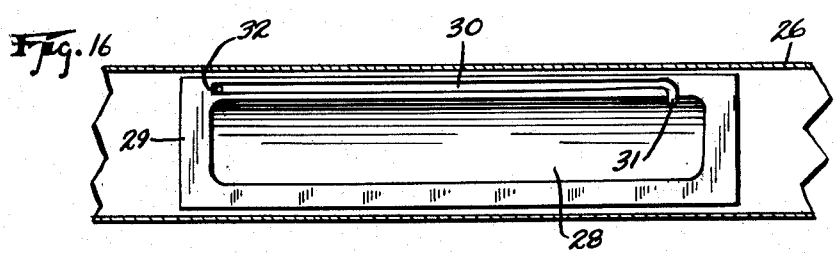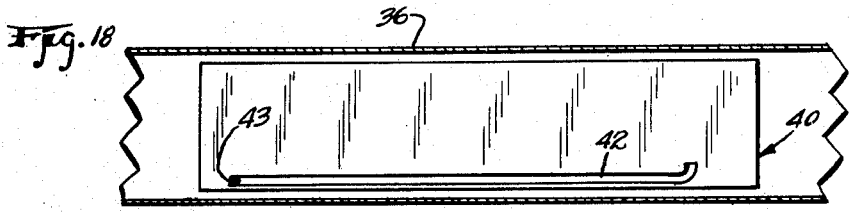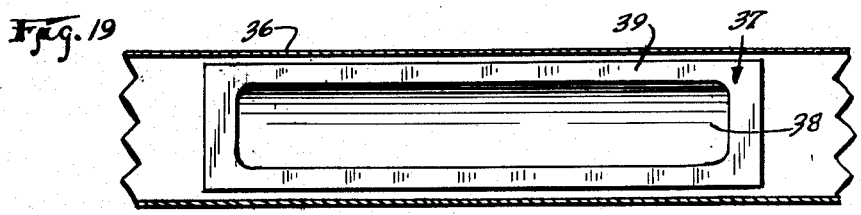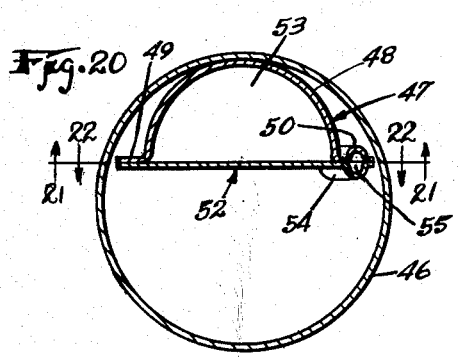
INVENTORS.
EDMUND LUDLOW &
BY BENJAMIN H. IRWIN.
ATTORNEYS.

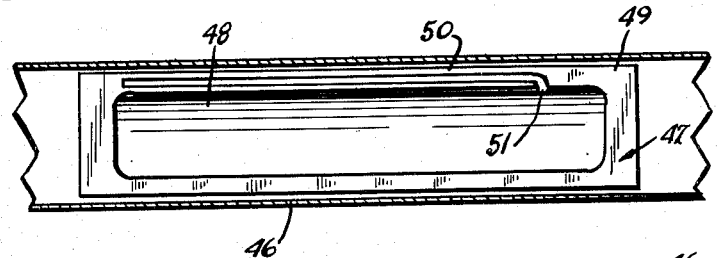
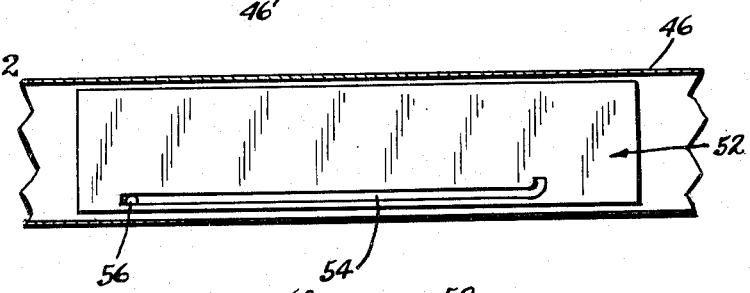
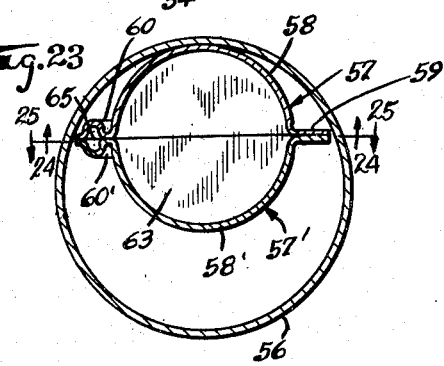
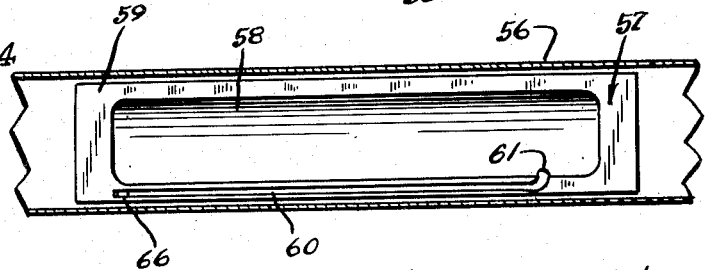
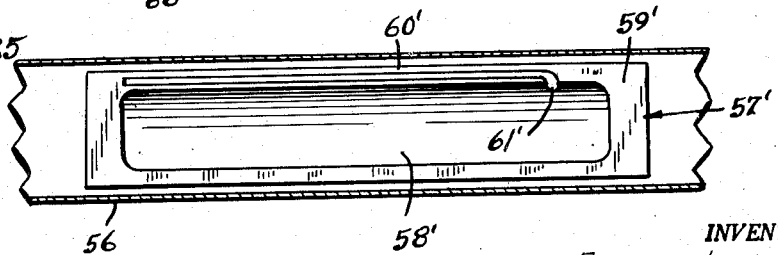
INVENTORS.
EDMUND LUDLOW &
BY BENJAMIN H. IRWIN,
ATTORNEYS.

April 14, 1964   E. LUDLOW ETAL   3,128,841
SOUND ATTENUATING GAS CONDUIT AND RESONATORS THEREFOR
Filed Aug. 17, 1961   6 Sheets-Sheet 6
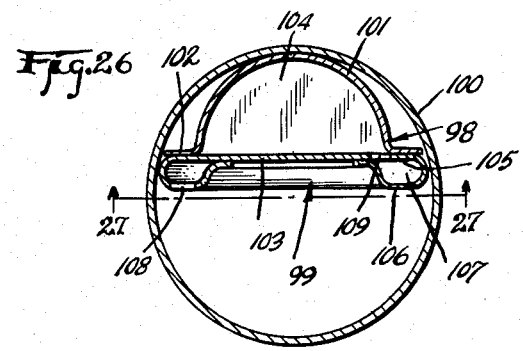
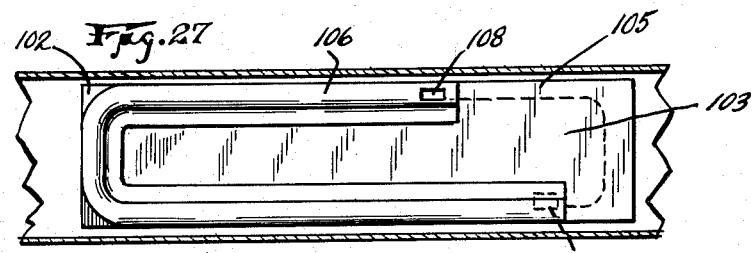
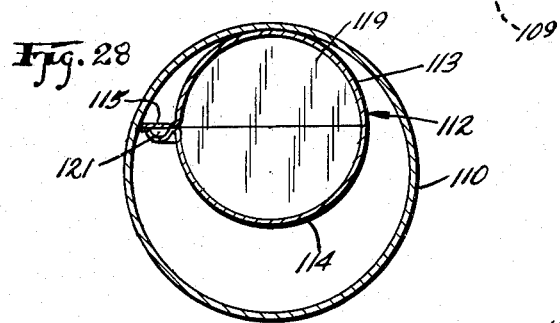
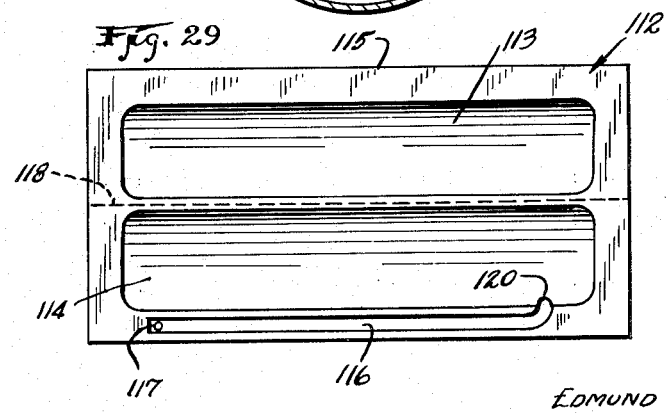
INVENTORS.
EDMUND LUDLOW &
BY BENJAMIN H. IRWIN,
Trask, Jenkins & Hanley
ATTORNEYS.

United States Patent Office 3,128,841
Patented Apr. 14, 1964

3,128,841
SOUND ATTENUATING GAS CONDUIT AND
RESONATORS THEREFOR
Edmund Ludlow and Benjamin H. Irwin, both of Columbus, Ind., assignors to Arvin Industries, Inc., Columbus, Ind., a corporation of Indiana
Filed Aug. 17, 1961, Ser. No. 132,117
15 Claims. (Cl. 181—59)

This invention relates to a sound attenuating gas conduit for conveying and attenuating the noise level of, a moving gas stream, and to a sound attenuating resonator for use with such a conduit.

It is an object of this invention to provide such a sound attenuating gas conduit which will meet limited space requirements, and which can be of a light weight construction with its weight substantially uniformly distributed along its length. It is a further object of the invention to provide such a sound attenuating gas conduit which will be less susceptible to certain types of corrosion than conventional gas-silencing systems, and which may employ replaceable sound attenuating resonators. It is a further object of the invention to provide a sound attenuating resonator which can be used in association with such a conduit having the configuration of a simple pipe, which resonators can be formed from inexpensive sheet-metal stampings, which can be made to effect sound attenuation over a wide range of frequencies, which may be tuned to attenuate undesired frequencies, and which will remain substantially in tune with said frequencies irrespective of temperature changes of the gas stream in which the sound waves are carried.

It is a special object of the invention to provide a sound attenuating conduit for the exhaust gas stream of an automotive vehicle and employing sound attenuating resonators which will eliminate the need for the bulky, expensive, and troublesome mufflers which are required in conventional automotive exhaust-silencing systems.

The present invention is concerned with the construction of sound attenuating resonators mounted in a conduit for conveying the exhaust gases away from an automotive engine. Such resonators may be constructed from inexpensive sheet-metal stampings and may be constructed such that they are tuned to attenuate different and overlapping bands of sound wave frequencies. Prior resonator constructions of this general type for use in association with a sound attenuating conduit have used auxiliary components, such as the adjacent conduit walls, to help form the resonators, or have employed more expensive constructions utilizing interconnected lengths of tubing of different diameters and lengths. However, the instant invention overcomes these problems by the employment of resonators which may be wholly and completely formed from sheet-metal stampings.

In the employment of the invention as an exhaust system for an automotive vehicle, the exhaust manifold of the engine is connected to a pipe to convey the exhaust gases emanating from said engine to the desired discharge point, as at the rear of the vehicle. Such a pipe, usually with at least part of the manifold, forms a conduit in which the exhaust sound produces standing wave pressure patterns wherein each of the several harmonic components of the standing waves have one or more distinct pressure points, that is, points of maximum sound pressure, at particular locations along the conduit. Our present invention is concerned with the construction of sound attenuating resonators mounted in the conduit at or adjacent these pressure points and tuned to attenuate the noise level of the frequencies producing such pressure points.

In accordance with one form of construction of said resonators, there is provided a pair of opposed sheet-metal shells which are contoured and interconnected in a manner to provide first wall areas in spaced relation to each other to form a resonator volume. Second wall areas are provided on said shells which border said first wall areas and serve to enclose the periphery thereof and form the interconnecting surfaces for the pair of shells. Formed within the extent of said second wall areas are third wall areas in spaced relation to each other and forming a resonator throat opening within the extent of said volume and outside the extent of said second wall areas. Thus, with the resonators mounted in the conduit, the resonator throats will operatively interconnect the resonator volumes with the gas-flow passage formed by the conduit whereby said resonators will attenuate the noise level of the exhaust gases moving through said conduit.

Other objects and features of the invention will become apparent from the more detailed description which follows and from the accompanying drawings, in which:

FIG. 1 is a fragmentary isometric view partially broken away and showing a sound attenuating conduit embodying our invention;

FIG. 2 is an enlarged fragmentary longitudinal section of the conduit shown in FIG. 1, and showing our sound attenuating resonators mounted therein;

FIG. 3 is an enlarged fragmentary horizontal section taken on the line 3—3 of FIG. 1;

FIG. 4 is an enlarged fragmentary horizontal section taken on the line 4—4 of FIG. 1;

FIG. 5 is an enlarged vertical section taken on the line 5—5 of FIG. 2;

FIG. 6 is a fragmentary longitudinal section of a sound attenuating conduit embodying our invention with a modified embodiment of our sound attenuating resonators mounted therein;

FIG. 7 is an enlarged vertical section taken on the line 7—7 of FIG. 6;

FIG. 8 is a horizontal section taken on the line 8—8 of FIG. 6;

FIG. 9 is a fragmentary longitudinal section of a sound attenuating conduit embodying our invention with a modified form of the sound attenuating resonators shown in FIG. 6 mounted therein;

FIG. 10 is an enlarged vertical section taken on the line 10—10 of FIG. 9;

FIG. 11 is a horizontal section taken on the line 11—11 of FIG. 9;

FIG. 12 is a fragmentary longitudinal section of a sound attenuating conduit embodying our invention with a modified form of the sound attenuating resonators shown in FIG. 6 mounted therein;

FIG. 13 is an enlarged vertical section taken on line 13—13 of FIG. 12;

FIG. 14 is a horizontal section taken on the line 14—14 of FIG. 12;

FIG. 15 is a vertical section of a sound attenuating conduit embodying our invention with a modified form of the sound attenuating resonators shown in FIG. 2 mounted therein;

FIG. 16 is a horizontal section taken on a reduced scale on the line 16—16 of FIG. 15;

FIG. 17 is a vertical section of a sound attenuating conduit embodying our invention with a modified form of the sound attenuating resonators shown in FIG. 2 mounted therein;

FIG. 18 is a horizontal section taken on a reduced scale on the line 18—18 of FIG. 17;

FIG. 19 is a horizontal section taken on a reduced scale on the line 19—19 of FIG. 17;

FIG. 20 is a vertical section of a sound attenuating conduit embodying our invention with a modified form of the sound attenuating resonators shown in FIG. 2 mounted therein;

FIG. 21 is a horizontal section taken on a reduced scale on the line 21—21 of FIG. 20;

FIG. 22 is a horizontal section taken on a reduced scale on the line 22—22 of FIG. 20;

FIG. 23 is a vertical section of a sound attenuating conduit embodying our invention with a modified form of the sound attenuating resonators shown in FIG. 2 mounted therein;

FIG. 24 is a horizontal section taken on a reduced scale on the line 24—24 of FIG. 23;

FIG. 25 is a horizontal section taken on a reduced scale on the line 25—25 of FIG. 23;

FIG. 26 is a vertical section of a sound attenuating conduit embodying our invention and showing a modified embodiment of our sound attenuating resonator mounted therein;

FIG. 27 is a horizontal section taken on a reduced scale on the line 27—27 of FIG. 26;

FIG. 28 is a vertical section of a sound attenuating conduit embodying our invention and showing still another modified embodiment of our sound attenuating resonator mounted therein; and FIG. 29 is a plan view of a sheet-metal stamping forming the resonator shown in FIG. 28.

This invention is particularly well adapted for use with an internal combustion engine in an automotive vehicle to silence the exhaust gases emanating from said engine and to convey them to a suitable discharge point. The essential features characterizing this invention are the construction of our resonators and their combination with a pipe for conveying the exhaust gas from an engine to a suitable discharge point, said resonators attenuating the noise level of the gases passing through said pipe. These resonators are formed from sheet-metal stampings which are constructed so as to form resonator volumes and throats tuned to the desired sound wave frequencies and mountable within said pipe in the desired locations.

Our resonators comprise a plurality of sheet-metal stampings which are rigidly secured to the inner wall of the gas-carrying pipe. Because the resonators are formed from relatively small sheet-metal stampings, the overall weight of the silencing system will be minimized, as will the cost of such system. Further, because of their relatively small size, the resonators can be mounted in the pipe in any desired circumferential position to thus obviate mounting them on the bottom of the pipe in a position in which they would trap condensed corrosive materials. Furthermore, our resonators, being mounted within the piper, are in direct thermal-coupling relationship with the exhaust gases passing through said pipe. The frequencies of the sound waves in the exhaust gases will vary with temperature changes in said gas stream, but with the resonators mounted internally of the pipe, they will assume the temperature changes of the gas stream and will substantially remain in tune with the sound wave frequencies which they are tuned to attenuate irrespective of the temperature of the gas stream.

In the operation of a conventional internal combustion engine in an automobile, the combustion of fuel within the cylinders produces a substantial volume of hot exhaust gases which are exhausted with substantial noise into the exhaust manifolds mounted on the engine in communication with the cylinder exhaust ports. The frequencies of the sound waves in such exhaust gases extend over a wide range, such as from about 30 cycles per second, to about 5,000 cycles per second, with the lower frequencies largely representing the fundamental and lower harmonics determined by the length of the exhaust conduit. In many exhaust systems it is the lower range of frequencies, i.e., frequencies below 200 cycles per second, that are the most difficult to attenuate and produce the most objectionable noises, especially since it is in this low frequency range that the firing frequencies of the engine coincide with and augment the natural resonant frequencies of the exhaust system itself.

The lower frequencies are particularly difficult to silence when the engine is propelling the vehicle at a rate of speed of from about 20 miles per hour to about 50 miles per hour. At these speeds most engines fire at frequencies below 200 cycles per second, the range in which the fundamental and first overtone of substantially all silencing systems fall. Generally, if the engine is propelling the automobile at a speed slower than about 20 miles per hour, its firing frequencies will be well below the fundamental frequency of the silencing system and thus will not coincide with nor augment the natural resonant frequency of the exhaust system itself to any appreciable extent. And if the engine is propelling the automobile faster than about 50 miles per hour, its firing frequencies will generally be higher than the first overtone of the exhaust system. Also, the natural road noises at these higher speeds are more predominant than the exhaust gas noises.

In many conventional mufflers these lower frequencies are quite difficult to attenuate because the large size of the mufflers prevents them from being positioned in the exhaust system on the under-side of the vehicle to act upon and attenuate these low frequencies.

Our invention is adapted to attenuate the exhaust noises incident to the operation of an internal combustion engine over a wide range of sound wave frequencies, including the troublesome frequencies below 200 cycles per second, by passing the exhaust gases of said engine through an exhaust conduit having a plurality of resonators mounted within it along its length. The resonators may be tuned to attenuate different and overlapping bands of frequencies. While resonators in accordance with our invention may be used alone to effect attenuation of the exhaust gas noises, they may be used in combination with conventional mufflers, or may be incorporated within otherwise conventional mufflers as acoustical muffler components, or used in combination with acoustical liners employed in the manifold or in the exhaust conduit itself.

The embodiment shown in FIG. 1 comprises a pipe 10 adapted to be connected at one end to an exhaust manifold by a conventional mounting flange 14, with its opposite end open to the atmosphere. Conveniently, the pipe 10 may have the same outer diameter as the exhaust and tail pipes used in conventional exhaust systems. For example, it may have a diameter of about one and three-quarters to two and one-half inches, the diameters normally used in conventional exhaust pipes and tail pipes on automobiles; but it may have a larger diameter, say as large as four inches, the diameter of conventional exhaust and tail pipes in trucks, buses, and other large vehicles. While the pipe 10 is shown as having a unitary length, it may be formed from a plurality of short interconnected lengths of pipe to facilitate the installation and replacement of the resonators.

FIG. 1 illustrates a silencing system employing a plurality of resonators formed from a pair of opposed sheet-metal members. The resonators shown in FIGS. 1–3 are of the same type as those illustrated in FIGS. 15, 17, 20, and 23, each of these illustrated embodiments differing from one another in portions of their opposed members which are deformed to form the resonator throats and volumes.

The resonators illustrated in FIGS. 1–5 are formed from a pair of opposed sheet-metal shells 17 and 18 rigidly secured together and mounted within the pipe 10, as by welding one of said shells to the inner face of said pipe. As shown in FIG. 3, the shell 17 has a plurality of concavities 20 formed in it with each of said concavities being bordered by a coplanar wall area 21. Formed within the wall area 21 is a plurality of beads 22 projecting out of the plane of said wall area in the same direction as the concavities 20. As shown, one end of each of the beads 22 is in open communication with one of the concavities 20, as at 19, with the opposite end of said bead being disposed in open communication with the interior of the pipe 10, as at 24.

The shell 18 also has formed within it a plurality of concavities 20' surrounded by coplanar wall areas 21'. The lateral extents of the concavities 20' and the wall areas 21' correspond to the lateral extents of the concavities 20 and wall areas 21, respectively, of the shell 17 so that the two shells may be disposed in opposed relationship with their abutting wall areas 21 and 21' rigidly secured together and constituting second wall areas forming a gas tight seal around said concavities. As shown in FIG. 5, when the shells are secured together, their opposed concavities 20 and 21' constitute first wall areas which form resonator volumes 23, and the beads 22 and the portions of the wall area 21' in alignment therewith constitute third wall areas which form resonator throats 25 interconnecting said volumes to the gas-flow passage of the pipe 10 whereby the resonators formed by said throats and volumes will attenuate the noise level of the gases passing therethrough.

As an alternative (not shown) to the termination of the beads 22 at the edge 24 of the wall area 21 to dispose the throats 25 in communication with the gas-flow passage, said beads may terminate inwardly from said edge, and openings may be formed in either the beads or the portions of the wall area 21' in alignment with said beads.

In order that the system of resonators will attenuate a substantial range of sound wave frequencies in the exhaust gases, it is necessary that the individual resonator volumes and throats be tuned with respect to the harmonic characteristics of the exhaust conduit and/or the firing frequencies of the engine. The latter, at least in the troublesome range below 200 cycles per second, normally are correlated with the former so that in most instances the resonators are tuned to frequencies which constitute multiples of fundamental resonant frequency of the conduit. Such multiples may constitute whole number multiples (for example, 1, 2, 3, etc.) in which case the resonators will be tuned to the various harmonics of the conduit, and such multiples may also constitute mixed number multiples (for example, 1½, 2½, etc.) in which case the resonators will be tuned to fractional components of the conduit harmonics. Desirably, the resonators are tuned to both the whole number multiples and mixed number multiples of the fundamental resonant frequency of the conduit, and are thus correlated with, and responsive to, both the harmonic conduit frequencies and the firing frequencies of the engine when said engine is propelling a vehicle at speeds in the range of from about 20 m.p.h. to about 50 m.p.h.

Tuning of the resonators may be effected by adjusting the conductivity of the resonator throat with respect to the size or capacity of the resonator volume. The formula for calculating such tuning may be represented by the formula:

$$f = \frac{C}{2\pi}\sqrt{\frac{C_0}{V_c}}$$

where $f$ is the frequency to which the resonator is to be tuned, C is the speed of sound in inches per second at the temperature of the medium, $V_c$ is the capacity of the resonator volume, and $C_0$ is the conductivity of the resonator throat calculated from the formula:

$$C_0 = \frac{2\pi r^2}{2h + \pi r}$$

where $r$ is the radius of the throat and $h$ is the length of the throat. Where the throats are non-circular, as in the case of the resonators shown in FIGS. 1-5, their conductivity may be calculated by the above formula using their cross-sectional areas instead of quantity $\pi r^2$, and the mean radii of their cross-sections instead of the quantity $\pi r$. While each resonator attenuates to a maximum degree the particular frequency to which it is tuned, it will, of course, attenuate to a lesser extent a limited band of frequencies on either side of that particular frequency, and will effect some attenuation of substantially all frequencies. It is apparent that this tuning of the throats may be easily accomplished by merely controlling the depth and/or longitudinal and lateral extents of the concavities 20 and 20' and the beads 22.

The fundamental resonant frequency of the exhaust conduit with which the frequency of the resonators are to be co-ordinated depends upon the speed of sound, and as shown by the first formula set forth above, the frequency of a resonator likewise depends upon the speed of sound. Since the speed of sound varies with temperature, a temperature gradient between the resonator throats and exhaust gases will interfere with the co-ordination necessary for the resonators to achieve their maximum attenuation. These changes in the speed of sound resulting from changes in temperature of the medium in which the sound waves are carried will also cause the frequencies of the sound waves to change, the degree of frequency change depending upon the temperatures and frequencies involved. In our exhaust conduit, the temperature of the exhaust gases in the engine to which the conduit is connected will vary over a wide temperature range of from about 200° F., when the engine is cold, to a temperature of about 1,700° F., when the engine is hot.

In a typical example of our invention using an exhaust conduit having a first overtone (second harmonic) of 80 cycles per second, we have found that that first overtone shifted to 106 cycles per second when the engine was propelling the vehicle 25 miles per hour, and that it was shifted to 121 cycles per second when the engine was propelling the vehicle 50 miles per hour. This frequency shifting resulted from the increased temperatures of the exhaust gases. Furthermore, at 25 miles per hour the engine had a firing frequency of about 80 cycles per second, and a firing frequency of 120 cycles per second at 50 miles per hour. As will be apparent, in the lower frequency range, i.e., below 200 cycles per second, the firing frequencies of the engine coincide with and augment the natural resonant frequencies of the exhaust conduit making these lower frequency ranges extremely difficult to attenuate.

Our resonator construction, however, permits the resonators to be mounted within the conduit in the gas stream so that said resonators are thermally coupled thereto. Thus, they are subjected to the same temperature changes as the gas stream to maintain a minimal temperature gradient between said resonators and the gas stream irrespective of gas stream temperature changes and thus cause said resonators to be co-ordinated with the resonant hermonic pipe frequencies which they are to attenuate.

Preferably, the resonators formed by the shells 17 and 18 are tuned to attenuate the objectionable harmonics, or fractional components of said harmonics, in the gases in the conduit. Each of these harmonic components will have specifically located maximum sound-pressure points along the length of the conduit, the number of such pressure points and their location being a function of the particular harmonic component involved. For example, the second overtone (third harmonic) will have three maximum pressure points along the conduit which will occur at points spaced from either end of the conduit by distances of one-sixth, one-half, and five-sixths of the conduit-length. Each of the resonators will attenuate to the maximum degree the particular harmonic, or fraction of a harmonic, to which it is tuned, if its throat opening is coupled to the gas stream at one of the points of maximum pressure of the harmonic or harmonic fraction for which it is tuned. While the resonators will effect maximum attenuation while their throats are located precisely at their maximum pressure points, they will, of course, still operate at high attenuation efficiencies if their throats are located adjacent such pressure points. For example, we have found that a resonator will operate at not less than 90% efficiency if its throat opening is placed at any point within a distance from the true maximum pressure point equal to one-twentieth of the length of the sound wave producing the pressure point.

In general, such maximum pressure points are spaced from an end of the conduit by fractions L of the conduit-length according to the formula:

$$L = \frac{2m-1}{2n}$$

where $n$ is the harmonic number for which the resonator is tuned, and $m$ is every integer between and including 1 and $n$.

The above formula is used for calculating the locations of the various sound pressure points when the conduit and the exhaust gases moving therethrough are at ambient temperatures. However, when the engine connected to the conduit is in operation under normal conditions of use, it will discharge gases into the conduit at elevated temperatures thereby increasing the temperature of the conduit and increasing the velocity of the sound waves carried in said gases to shift the locations of the pressure points as calculated from the above formula. When the engine is operating under normal conditions, the locations of the pressure points shift downstream a distance equal to from about 2% to about 4% of the wave length of the frequencies producing the various pressure points. The temperature gradient along the condit from the exhaust manifold on the engine to the discharge end of said conduit is not uniform, and the locations of the pressure points toward the upstream end of the conduit will be shifted downstream to a greater degree than the locations of the pressure points toward the discharge end of the conduit. Thus, the resonators are tuned to attenuate the desired sound wave frequencies in the gases in the conduit and the above formula is employed to determine the positions that the resonator throats should open into the conduit. However, for the resonators to achieve maximum effectiveness, the resonators are mounted on the conduit with their throats opening into the conduit at points spaced downstream from the locations calculated by said formula by distances equal to about 2% to about 4% of the wave length of the frequencies to which the resonators are tuned.

In certain instances, particularly in the low frequency ranges, it is necessary to employ several resonators to attenuate a particular frequency. The construction shown in FIGS. 1–5 overcomes this problem in that it provides wall areas 21 and 21' of substantial extent so that the throats 25 formed by the beads 22 and the aligned portions of the wall area 21' may be disposed in open communication with the interior of the pipe 10 at substantially the same axial position. This permits all of the resonators formed by the shells 17 and 18 to have their throats operatively connected to the pipe at the same sound pressure point whereby all of said resonators will attenuate to the maximum degree the sound wave frequency producing said pressure point.

The resonator shown in FIGS. 15 and 16 is also mountable in a pipe 26 forming a gas-flow passage for attenuating the noise level of the gases passing therethrough. As shown, the resonator is formed from a sheet-metal shell 27 and plate 4, the shell 27 being rigidly secured to the inner face of the pipe 26. The shell 27 is provided with a concavity 28 surrounded by a wall area 29 having an elongated bead 30 formed therein, said bead being in open communication with the concavity 28, as at 31, and the interior of the pipe 26 as at 32. The plate 34 is rigidly secured to the wall area 29 and overlies the concavity 28 to form therewith a resonator volume 35 and the bead 30 to form therewith a resonator throat 36 operatively interconnecting said volume with the interior of the pipe 26 whereby said throat and volume will attenuate the noise level of the gases passing through the pipe 26.

The resonator shown in FIGS. 17–19 is also mountable in a pipe 36 forming a gas-flow passage for attenuating the noise level of the gases passing therethrough. As shown, said resonator is formed from a sheet-metal shell 37 and a plate 40, the shell 37 being rigidly secured to the inner face of the pipe 36. The shell 37 has a concavity 38 surrounded by a wall area 39. The plate 40 is rigidly secured to the said wall area 39 with its central portion overlying the concavity 38 to form therewith a resonator volume 41. Formed in the portion of the plate 40 in alignment with the wall area 39 is an elongated, outwardly projecting bead 42 having one of its ends open to the interior of the pipe 36, as at 43, and its opposite end terminating within the extent of the concavity 38, and thus the volume 41. Thus, the bead 42 and the portion of the wall area 39 in alignment therewith form a resonator throat 44 operatively interconnecting the volume 41 with the interior of the pipe 36 whereby said throat and volume will attenuate the noise level of the gases passing through said pipe.

The resonator shown in FIGS. 20–22 is also mountable in a pipe 46 forming a gas-flow passage for attenuating the noise level of the gases passing therethrough. As shown, said resonator is formed from a sheet-metal shell 47 and plate 52, said shell being rigidly secured to the inner face of the pipe 46. The shell 47 is provided with a concavity 48 surrounded by a wall area 49 having an elongated bead 50 formed therein, said bead being in open communication with the concavity 48, as at 51. The plate 52 is rigidly secured to the wall area 49 with its central portion overlying the concavity 48 to form therewith a resonator volume 53. The bead 54 is formed in the portion of the plate secured to the wall area 49 and is disposed in alignment with the bead 50 to form therewith a resonator throat 55 which is in open communication with the volume 53, as at 51, and in open communication with the interior of the pipe 46 by an opening 56 formed in either the bead 50 or 54, or both, whereby said volume and throat will attenuate the noise level of the gases passing through the pipe 46.

The resonator shown in FIGS. 23–25 is also mountable in a pipe 56 forming a gas-flow passage for attenuating the noise level of the gases passing therethrough. As shown, said resonator is formed from a pair of identical sheet-metal shells 57 and 57', with one of said shells being rigidly secured to the inner face of the pipe 56. The shell 57 is provided with a concavity 58 bordered by a wall area 59 having an elongated bead 60 formed therein, said bead being in open communication with the concavity 58, as at 61. Likewise, the shell 57' is provided with a concavity 58' surrounded by a wall area 59' having an elongated bead 60' formed therein, said bead being in open communication with the concavity 58', as at 61'. The two shells are disposed in opposed relationship with their abutting wall areas 59 and 59' rigidly secured together. This disposes the pair of concavities 58 and 58' in opposed relationship to form a resonator volume 63 and the beads 60 and 60' in opposed relation to form a resonator throat 65 which is in open communication with the volume 63, as at 61 and 61', and in open communication with the interior of the pipe 56 by an opening 66 formed in either bead 60 or 60', or both, whereby said volume and throat will attenuate the noise level of the gases passing through the pipe 56.

All of the resonators shown in FIGS. 2, 15, 17, 20, and 23 are formed from pairs of sheet-metal members having wall areas which project generally out of the plane of the wall portions of said members forming the concavities which define the resonator volumes. This permits each of these embodiments to employ a construction in which a pair of sheet-metal members may form a plurality of resonators. Although this feature is only illustrated in the specific embodiment shown in FIG. 2, it may also be employed in the specific embodiments illustrated in FIGS. 15, 17, 20, and 23.

It is well known that there are limits to which sheet-metal can be drawn and contoured, and since the resonators shown in FIGS. 2, 15, 17, 20, and 23 are tuned by controlling the volume-forming and throat-forming contours of the sheet-metal members forming the resonators, this may, in certain instances, place limitations on the tuning of the resonators. However, such limitations are overcome by the basic construction of the resonators shown in this series of figures. The alternative use of the specific embodiments of resonator construction shown in FIGS. 2, 15, 17, 20, and 23 permits the production of resonators having different size volumes and throats of different cross-sections. For example, if it is desired to employ a resonator having a cross-section one-half as small as the cross-section of the embodiment shown in FIG. 23, the embodiment shown in FIG. 15 may be employed. Thus, while the resonators shown in FIGS. 2, 15, 17, 20, and 23 employ the same basic structural concept, they may be alternatively employed to produce resonators having throats and volumes in different size ranges to thus provide a resonator system which can be tuned to attenuate wide ranges of sound wave frequencies.

The resonators illustrated in FIGS. 6, 9 and 12 are all of the same general type formed from pairs of interfitting shells, with each of the illustrated embodiments differing from one another in the portions of their resonator-forming shells which are deformed to form the resonator throats.

The resonator illustrated in FIGS. 6–8 is formed from a pair of opposed sheet-metal shells 68 and 69 disposed in interfitting engagement, with one of said shells, 68 as shown, rigidly secured, as by welding, to the inner face of a pipe 70 forming a gas-flow passage. As shown, the shell 68 is formed with a centrally disposed concavity 71 terminating in a peripherally extending wall area 72. Likewise, the shell 69 is provided with a centrally disposed concavity 71' terminating in a peripherally extending wall area 72'. The cross-sectional extents of the shells 68 and 69 are such that the wall area 72' of the shell 69 may be press-fit over the wall area 72 of the shell 68, whereby the opposed concavities 71 and 71' define a resonator volume 73 sealed along its border by the interfitting wall areas 72 and 72'.

As shown in FIGS. 7 and 8, an outwardly projecting bead 74 is formed in the wall area 72' of the shell 69 so that with the two shells in interfitting engagement, said bead and the portion of the wall area 72 in alignment therewith define an elongated resonator throat 75. The throat 75 is in open communication with the pipe 70 and volume 73 by providing the bead 74 with an open end, as at 76, and by forming an opening 77 in the wall area 72 in alignment with the bead 74. In this manner, the throat 75 operatively interconnects the volume 73 with the gas-flow passage of the pipe 70 so that the resonator formed by said throat and volume will attenuate the noise level of the gases moving through the pipe 70.

The resonator illustrated in FIGS. 9–11 is formed from a pair of opposed sheet-metal shells 78 and 79 disposed in interfitting engagement, with one of said shells, 78 as shown, being rigidly secured to the inner face of a pipe 80 forming a gas-flow passage. As shown, the shell 78 is formed with a centrally disposed concavity 81 terminating in a peripherally extending wall area 82, said wall area 82 being provided with an elongated inwardly projecting bead 83. Likewise, the shell 79 is provided with a centrally disposed concavity 81' terminating in a peripherally extending wall area 82', said wall area 82' having an elongated outwardly projecting bead 83' formed within its extent. The cross-sectional extents of the shells 78 and 79 are such that the wall area 82' of the shell 79 may be press-fit over the wall area 82 of the shell 78, whereby the opposed concavities 81 and 81' define a resonator volume 85. With the shells 78 and 79 in interfitting engagement as shown in FIG. 10, the beads 83 and 83' are disposed in alignment with each other and define an elongated resonator throat 84. The throat 84 is in open communication with the interior of the pipe 80 by providing the bead 83' with an open end, as at 87, and in open communication with the volume 85 by forming an opening 86 in the bead 83. In this manner, the throat 84 operatively interconnects the volume 85 with the gas-flow passage of the pipe 80 so that the resonator formed by said throat and volume will attenuate the noise level of the gases moving through the pipe 80.

The resonator illustrated in FIGS. 12–14 is formed from a pair of opposed sheet-metal shells 88 and 89 disposed in interfitting engagement, with one of said shells, 88 as shown, being rigidly secured to the inner face of a pipe 90 forming a gas-flow passage. As shown, the shell 88 is formed with a centrally disposed concavity 91 terminating in a peripherally extending wall area 92, said wall area 92 having an elongated inwardly projecting bead 93 formed within its extent. The shell 89 is provided with a centrally disposed concavity 91' terminating in a peripherally extending wall area 92'. The cross-sectional extents of the shells 88 and 89 are such that the wall area 92' of the shell 89 may be press-fit over the wall area 92 of the shell 88, whereby the opposed concavities 91 and 91' define a resonator volume 94. With the shells 88 and 89 in interfitting engagement as shown in FIG. 13, the wall area 92' on the shell 89 will overlie the bead 93 to define therewith an elongated resonator throat 95. The throat 95 is in open communication with the pipe 90 and volume 94 by forming an opening 96 in the wall area 92' in alignment with the bead 93, and by forming an opening 97 in said bead. In this manner, the throat 95 operatively interconnects the volume 94 with the gas-flow passage of the pipe 90 so that the resonator formed by said throat and volume will attenuate the noise level of the gases moving through said pipe 90.

All of the resonators shown in FIGS. 6, 9, and 12 are formed from pairs of sheet-metal shells disposed in interfitting engagement. Their tuning is effected by the size of their concavities and by the length and depth of the throat-forming beads in the shells, i.e., the resonator shown in FIG. 9 having a throat having a cross-sectional extent approximately twice as large as the cross-sectional extents of the throats of the resonators illustrated in FIGS. 6 and 12. Thus, although the resonators shown in FIGS. 6, 9, and 12 embody the same structural concepts, they may be employed to provide throats to substantially two different ranges of sound wave frequencies, depending upon whether one or both of the interfitting shells is provided with a throat-forming bead.

The resonator shown in FIGS. 26 and 27 is formed from a pair of rigidly connected sheet-metal members 98 and 99, with the member 98 being rigidly secured, as by welding, to the inner face of a pipe 100 forming a gas-flow passage. The member 98 is provided with a centrally disposed concavity 101 terminating in a peripherally extending wall area 102. The member 99 has a central portion 103 overlying the concavity 101 and forms therewith a resonator volume 104. The marginal wall area 105 of the member 99 abuts and is rigidly secured to the wall area 102 to rigidly interconnect the two members and form a seal around the volume 104. A section of the wall area 105 of the member 99 is bent back over itself, as at 106, and is secured to the central portion 103 of the member 99, whereby said bent back section 106 defines an elongated resonator throat 107 lying within the lateral extents of the wall areas 102 and 105. The throat 107 is in open communication with the interior of the pipe 100 and the volume 104 by an opening 108 formed in the section 106 and by an opening 109 formed in the wall area 103 within the extent of the volume 104. In this manner, the throat 107 operatively interconnects the volume 104 with the gas-flow passage of the pipe 100 so that the resonator formed by said throat and volume will attenuate the noise level of the gases moving through the pipe 100.

Another modification of our resonator construction is shown in FIGS. 28 and 29, which resonator is mountable in a pipe 110 defining a gas-flow passage for attenuating the noise level of the exhaust gases moving therethrough. As shown, said resonator is formed from a sheet-metal blank 112 having a pair of abutting elongated concavities 113 and 114 formed therein and bordered by a coplanar peripheral wall area 115. An elongated bead 116 is also formed in the blank 112 within the extent of the wall area 115, said bead having one of its ends open as at 117 and its opposite end terminating within the extent of the concavity 114.

As shown in FIG. 28, the blank 112 is bendable along an imaginary line 118 into the position shown in FIG. 28 in which the opposed concavities 113 and 114 define a resonator volume 119, sealed along its border by the wall area 115 adjacent the concavity 113 which abuts, and is rigidly secured to, the portion of the wall area 115 adjacent the concavity 114. In this assembled position, a portion of the wall area 115 adjacent the concavity 113 overlies the bead 116 to form therewith a resonator throat 121 which is in open communication with the gas-flow passage, as at 117, and the resonator volume 119, as at 120, so that the resonator will attenuate the noise level of the gases moving through the pipe 110.

While the blank 112 is illustrated as having a pair of volume-forming concavities and a single throat-forming bead formed in it, it is to be understood that said blank may also be formed with only one such concavity and a pair of such beads (not shown), or any desired combination of concavities and beads, depending upon the frequency range to which the resonator is to be tuned.

Although the resonators shown in FIGS. 26–29 are shown as being formed in single units, it is to be understood that blank 112 in FIG. 29 and the pair of members 98 and 99 in FIG. 26 may be constructed in the manner of the members 17 and 18 in FIG. 2 so that a single blank 112 and a single pair of members 98 and 99 will form a plurality of resonators. Although not shown in the drawings, this is merely accomplished by employing an elongated blank 112 and elongated members 98 and 99 and forming a plurality of longitudinally spaced volume and throat-forming contours therein.

While our resonators have been shown as being mounted within a gas-carrying pipe having a circular cross-section, it is to be understood that said pipe may have any desired cross-sectional configuration. Indeed, in certain applications it may be desirable for purposes of vertical clearance to flatten such gas-carrying pipe into a generally elliptical cross-section (not shown). Likewise, the resonators may also have geometric cross-sectional configurations other than the generally circular and semi-circular cross-sectional configurations illustrated.

For purposes of simplicity of description, the invention has only been described for use in an exhaust system for an engine. However, it may, of course, also be used on the intake side of an internal combustion engine for transporting and silencing the gas intake flow to the engine, or many other silencing applications.

We claim as our invention:

1. A sound attenuating resonator formed from a pair of sheet-metal members, comprising first wall areas on said members spaced inwardly from the peripheral edges thereof and disposed in spaced relationship to each other to form a resonator volume, said first wall areas constituting a concavity formed in at least one of said members and that portion of the other member extending thereover, second wall areas on said members constituting the abutting margins thereof and rigidly interconnected to each other and bordering said first wall areas, and third wall areas within the extent of said second wall areas and disposed in spaced relationship to each other to form a resonator throat, said third wall areas constituting a bead formed in at least one of said members and that portion of the other member extending thereover, said bead terminating within the extent of said concavity and at least one of said members being provided with an opening within the extent of its third wall area whereby said throat is open within and without the extent of said volume for operatively interconnecting said volume to a sound energy source for attenuating the noise level thereof, said volume being completely enclosed except for its connection to said throat.

2. The invention as set forth in claim 1 in which said pair of members comprise a flat plate and a contoured shell, and said first wall areas are a concavity formed in said shell and that portion of said plate extending thereover, and said bead is formed in said shell.

3. The invention as set forth in claim 2 in which said bead is an integral extension of said concavity.

4. The invention as set forth in claim 1 in which said third wall area of each of said pair of members constitutes a bead, the beads in the two members being in aligned, opposed relationship and terminating within the extent of said concavity, and at least one of said beads is provided with an opening formed therein constituting said at least one opening in said third wall area.

5. The invention as set forth in claim 4 in which said first wall area of each of said pair of members constitutes a concavity, the concavities in the pairs of members being in aligned, opposed relationship.

6. The invention as set forth in claim 1 in which said first wall areas comprise a concavity formed in one of said pair of members and a generally coplanar portion of the other of said pair of members, said second wall areas comprise the generally coplanar margins of said pair of members, and said bead is formed in said other of said pair of members.

7. The invention as set forth in claim 1 in which said first wall areas of each of said pair of members constitutes a concavity, the concavities in the pair of members being in aligned, opposed relationship, and said second wall areas are the peripheral margins of said pair of members.

8. The invention as set forth in claim 1 in which said sheet-metal members are a pair of interfitting shells having opposed concavities comprising their first wall areas, and said second wall areas are the overlapping peripheral margins of said shells.

9. The invention as set forth in claim 1 in which said pair of members comprise a pair of interfitting shells, and said first wall areas are opposed concavities formed in both of said shells, said second wall areas are the overlapping peripheral margins of said shells, and said third wall areas are a bead formed in at least one of said shells and that portion of the other shell extending thereover, said bead and said portion of said other shell having openings formed therein.

10. The invention as set forth in claim 9 in which said portion of said other shell is a bead in aligned, opposed relationship to the bead in said one of said shells.

11. The invention as set forth in claim 9 in which the second wall area of said one of said shells is disposed over the second wall area of said other shell and said bead projects outwardly from said one of said shells.

12. The invention as set forth in claim 9 in which said second wall area of said other of said shells is disposed over the second wall area of said one of said shells, and said bead projects inwardly of said one of said shells.

13. In a sound attenuating gas conduit for conveying, and attenuating the noise level of, a moving gas stream, a pipe forming a main gas-flow passage, at least one resonator carried within said pipe and comprising a pair of sheet-metal members having opposed first wall areas inward from the peripheral edges of said members and disposed in spaced relationship to each other to form a resonator volume, second wall areas bordering said first wall areas and rigidly joined together, and third wall areas within the extent of said second wall areas and disposed in spaced relationship to each other to form a resonator throat, said throat being in open communication with said volume and gas-flow passage for operatively interconnecting said volume and passage whereby said resonator will attenuate the noise level of the gas stream moving through said pipe, said volume being completely enclosed except for its connection to said throat, and at least one of said members being rigidly secured to the inwardly presented face of said pipe for mounting said resonator in said gas-flow passage.

14. An exhaust silencing system for an internal combustion engine, comprising a pipe for connection to the engine to receive the exhaust gases thereof and to convey such gases to a discharge point, said pipe forming a gas conduit wherein the exhaust gas sound produces one or more distinct sound-pressure points at particular locations along the conduit, and a resonator disposed adjacent one or more of said points, said resonator comprising a pair of sheet-metal members having opposed first wall areas inward from the peripheral edges of said members and disposed in spaced relationship to each other to form a resonator volume, second wall areas bordering said first wall areas and rigidly joined together, and elongated third wall areas within the extent of said second wall areas and disposed in spaced relationship to each other to form a resonator throat, said throat being in open communication with said volume and with the interior of said pipe adjacent the pressure point of the frequency to which it and its associated volume are tuned whereby said resonator will preferentially attenuate the noise level of said frequency, said volume being completely enclosed except for its connection to said throat, and at least one of said members being rigidly secured to the inwardly presented pipe face.

15. A sound attenuating resonator, comprising a pair of elongated sheet-metal members having a plurality of longitudinally spaced, opposed first wall areas disposed inward from the peripheral edges of said members and disposed in spaced relationship to each other to form a plurality of resonator volumes, said first wall areas constituting a plurality of concavities formed in at least one of said members and those portions of the other member extending thereover, abutting second wall areas extending around the periphery of said resonator volumes and rigidly joined together, and a plurality of third wall areas within the extent of said second wall areas and disposed in spaced relationship to each other to form a plurality of resonator throats, said third wall areas constituting a plurality of beads formed in at least one of said members and those portions of the other member extending thereover, said beads terminating within the extents of said concavities and at least one of said members being provided with openings within the extent of its third wall areas whereby each of said throats is open within and without the extent of one of said volumes for operatively connecting each of said volumes to a sound energy source for attenuating the noise level thereof, each of said volumes being completely enclosed except for its connection to its associated throat.

References Cited in the file of this patent

UNITED STATES PATENTS

| Re. 21,324 | MacKenzie et al. | Jan. 16, 1940 |
| 2,056,608 | Jack | Oct. 6, 1936 |
| 2,099,858 | MacKenzie et al. | Nov. 23, 1937 |
| 2,099,887 | Heath | Nov. 23, 1937 |
| 2,297,046 | Bourne | Sept. 29, 1942 |
| 2,580,564 | Ludlow | Jan. 1, 1952 |
| 2,694,462 | Robbins et al. | Nov. 16, 1954 |
| 3,031,026 | Price | Apr. 24, 1962 |